(12) United States Patent
Glenning et al.

(10) Patent No.: US 6,349,791 B1
(45) Date of Patent: Feb. 26, 2002

(54) SUBMARINE BOW DOME ACOUSTIC SENSOR ASSEMBLY

(75) Inventors: Daniel M. Glenning, Middletown; Bruce E. Sandman, Tiverton, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/541,834

(22) Filed: Apr. 3, 2000

(51) Int. Cl.7 ................................................. G08B 3/02
(52) U.S. Cl. ........................ 181/140; 181/139; 367/103; 367/119; 367/141; 367/149
(58) Field of Search ................................. 181/118, 120, 181/0.5, 139–142; 367/97, 103, 138, 119, 128, 141, 149; 73/587, 620, 640, 645

(56) References Cited

U.S. PATENT DOCUMENTS

| 3,831,137 A | * | 8/1974 | Cuomo | 340/8 R |
| 4,446,543 A | * | 5/1984 | McLandrich et al. | 367/149 |
| 5,155,707 A | * | 10/1992 | Fisher | 367/149 |
| 5,262,884 A | * | 11/1993 | Buchholz | 359/151 |
| 5,621,806 A | * | 4/1997 | Page et al. | 381/172 |
| 6,055,080 A | * | 4/2000 | Furstenau et al. | 359/151 |
| 6,081,481 A | * | 6/2000 | Sabatier et al. | 367/8 |
| 6,188,644 B1 | * | 2/2001 | Walsh et al. | 367/149 |

* cited by examiner

Primary Examiner—Robert E. Nappi
Assistant Examiner—Edgardo San Martin
(74) Attorney, Agent, or Firm—Michael J. McGowan; James M. Kaischke; Prithvi C. Lall

(57) ABSTRACT

A submarine bow dome acoustic sensor assembly comprises an outer hull bow portion, an inner pressure hull wall extending athwartships and in conjunction with the outer hull bow portion defining a free-flood compartment, and an acoustic bow panel disposed in the compartment and connected to the pressure hull wall by acoustically isolating supports. A laser scanner is disposed in the compartment and is oriented so as to project a laser beam onto a surface of the acoustic bow panel, and a sensor is disposed in the compartment and oriented so as to receive reflections of the laser beam off the acoustic panel and to transmit data from which a position of a sound generating source can be determined.

14 Claims, 3 Drawing Sheets

SUBMARINE BOW DOME ACOUSTIC SENSOR ASSEMBLY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The invention relates to target detection and tracking apparatus and is directed more particularly to a submarine bow dome acoustic sensor assembly for detecting and tracking noise-producing and/or noise-reflecting objects in an ocean environment.

2. Description of the Prior Art

In current submarines there is typically provided an outer hull and an inner pressure hull. The region therebetween is a "free flood" area, that is, it is flooded with sea water. In the bow area, the outer hull, or "bow dome" forms the forward-most portion of the boat. An acoustic panel is disposed between the bow dome and the forward-most inner hull which extends athwartships at the base of the bow dome. This acoustic panel is acoustically isolated from the bow dome and pressure hull. The bow dome is acoustically transparent and allows sound waves to travel therethrough and into the free flood zone and to the acoustic panel.

The acoustic panel typically is a generally spherically-shaped array of acoustic transducers known as a spherical array. This spherical array is quite heavy and expensive. There is a need for an acoustic sensor assembly which provides suitable detection and tracking capabilities, but which is lighter in weight and less expensive to manufacture than the current spherical acoustic panel.

SUMMARY OF THE INVENTION

Accordingly, an object of the invention is to provide a submarine bow dome acoustic sensor assembly which is of lighter weight than the current spherical arrays, which is reliable in detection and tracking of contacts, and which costs less to manufacture than the current spherical arrays.

With the above and other objects in view, as will hereinafter appear, a feature of the present invention is the provision of a submarine bow dome acoustic sensor assembly comprising an outer hull bow portion, an inner pressure hull wall extending athwartships, and in conjunction with the outer hull bow portion defining a free-flood compartment, and an acoustic bow panel disposed in the compartment and connected to the pressure hull wall by acoustically isolating supports. A laser scanner is disposed in the compartment and is oriented so as to project a laser beam onto a surface of the acoustic bow panel, and a sensor is disposed in the compartment and oriented so as to receive reflections of the laser beam off the acoustic panel and to transmit data from which a position of a sound generating source can be determined.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENT

Figure 1:
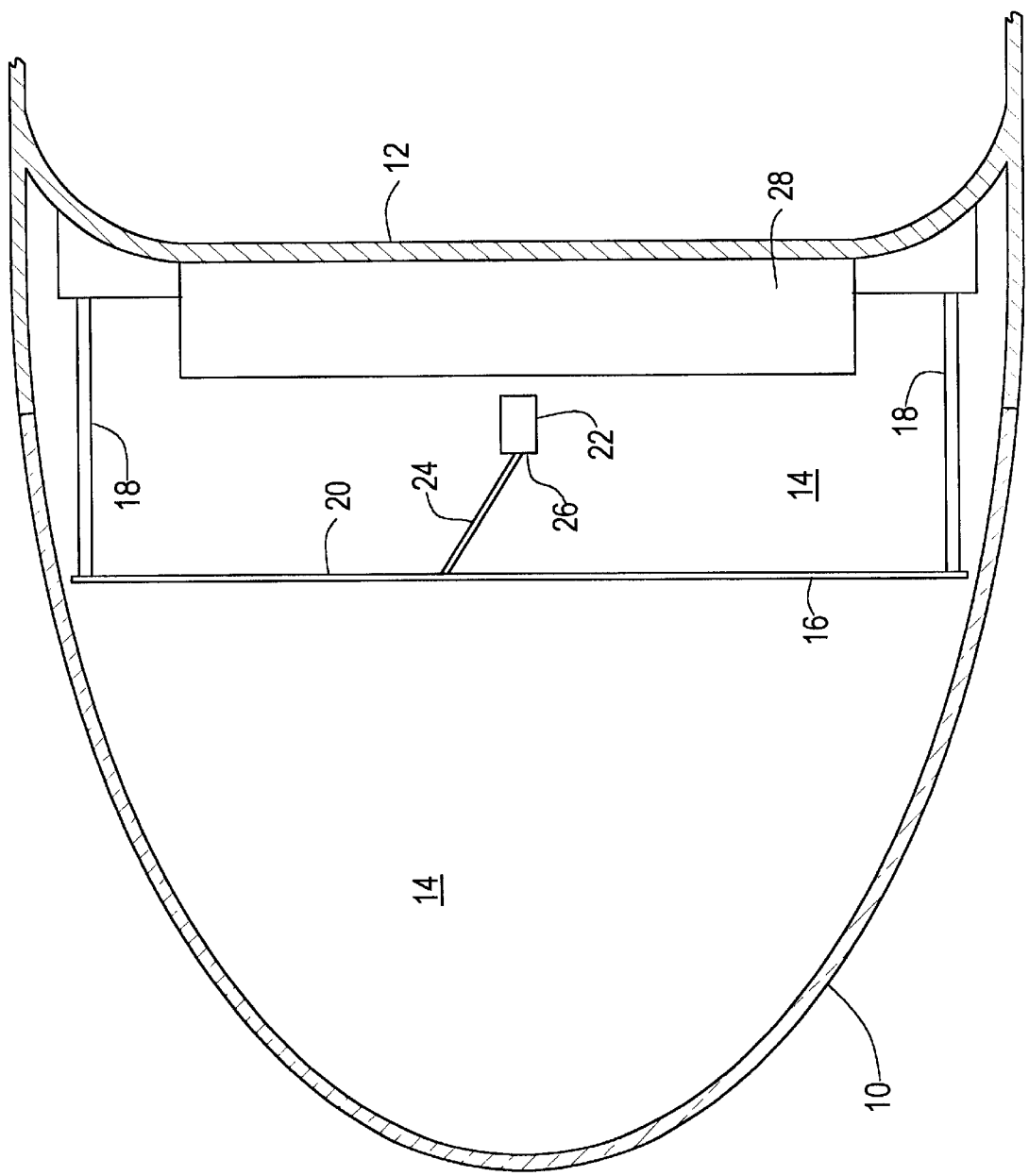
FIG. 1 is a diagrammatic top plan view of one form of submarine bow dome acoustic sensor assembly illustrative of an embodiment of the invention.

Referring to FIG. 1 it will be seen that an illustrative submarine bow dome acoustic sensor assembly includes a forward-most outer hull portion 10 of the submarine, known as the "bow dome". Proximate the base of bow dome 10 is a pressure hull portion 12 extending athwartships and, in conjunction with bow dome 10, defining a free flood zone 14.

Disposed within the free flood zone 14 is a planar acoustic panel 16 of lightweight rigid material, such as an aromatic polyamide material or other relatively stiff plastic, or aluminum, or other material sufficiently rigid to be self supporting. The panel 16 is of a circular configuration and is of a diameter such as to substantially fill the available space within the bow dome. The acoustic panel is mounted on pressure hull 12 by way of acoustically isolating supports 18. A surface 20 of acoustic panel 16 is provided with optical properties which permit analysis of light from a laser, as is known in the art.

Further disposed within the free flood zone 14 is a laser scanner 22 mounted in a vibrationally insulated manner. The laser scanner 22 is oriented to cast a laser beam 24 on surface 20 of acoustic panel 16. Such laser scanners are known in the art and often referred to a vibrometers, which operate to move a laser beam rapidly over a surface. The surface 20 can be of any configuration and the beam 24 can be moved in any pattern.

A sensor 26 is provided and may be in the same housing as the scanner 22, as illustrated in FIG. 1. The sensor 26 receives reflections of the laser beam 24 off the acoustic panel surface 20. The velocity of the scanned sections of the acoustic panel 16, caused by impinging sound waves passing through the bow dome 10, can be determined by doppler shift of the reflected light received by the sensor 26. The aforementioned optical properties of the acoustic panel surface 20 cause reflection of the reflected laser beam for collection by the sensor 26. A plurality of laser scanners 22 can be used to increase the speed at which the entire acoustic panel surface 20 is scanned. The data relative to speed of acoustic wave induced vibration of the acoustic panel is transmitted from sensor 26 to an onboard computer (not shown) for calculation of location and direction and speed of movement of a noise-producing object in the ocean environment.

The assembly as described above includes the flat acoustic panel 16. This configuration is of simple geometry and light weight. Further, the vibration modes induced by acoustic radiation are mathematically simple to model in comparison with more complex geometry. A downside is that the flat configuration renders difficult the detection of sounds directed to the acoustic panel from abeam, and perhaps from the port bow and starboard bow, depending on the angle of the incoming sound relative to the lengthwise axis of the submarine.-IN The assembly as described above is capable of "passive" detection, that is, receiving and analyzing noises from the ocean environment.

The assembly is provided with an acoustic sources array 28 to facilitate operations of an "active" detection character. The acoustic sources 28 may be "pingers", or the like, for sending forth sound waves which are reflected by objects in the water back to the acoustic panel 16. Thus, the assembly provides for both passive and active modes of operation.

In operation, the free flood zone 14 is flooded with sea water in which the acoustic panel 16 and other components of the assembly are submerged. Through either active or passive operation, sound waves pass through the outer hull 10 and impinge upon the acoustic panel 16, inducing vibrations in the panel 16. The laser scanner 22 scans surface 20 with laser beam 24 to obtain reflections at sensor 26. Frequency changes of the received reflections provide velocities of the surface 20 for computer analysis to obtain the position, course and speed of a noise generating or reflecting object.

Figure 2:
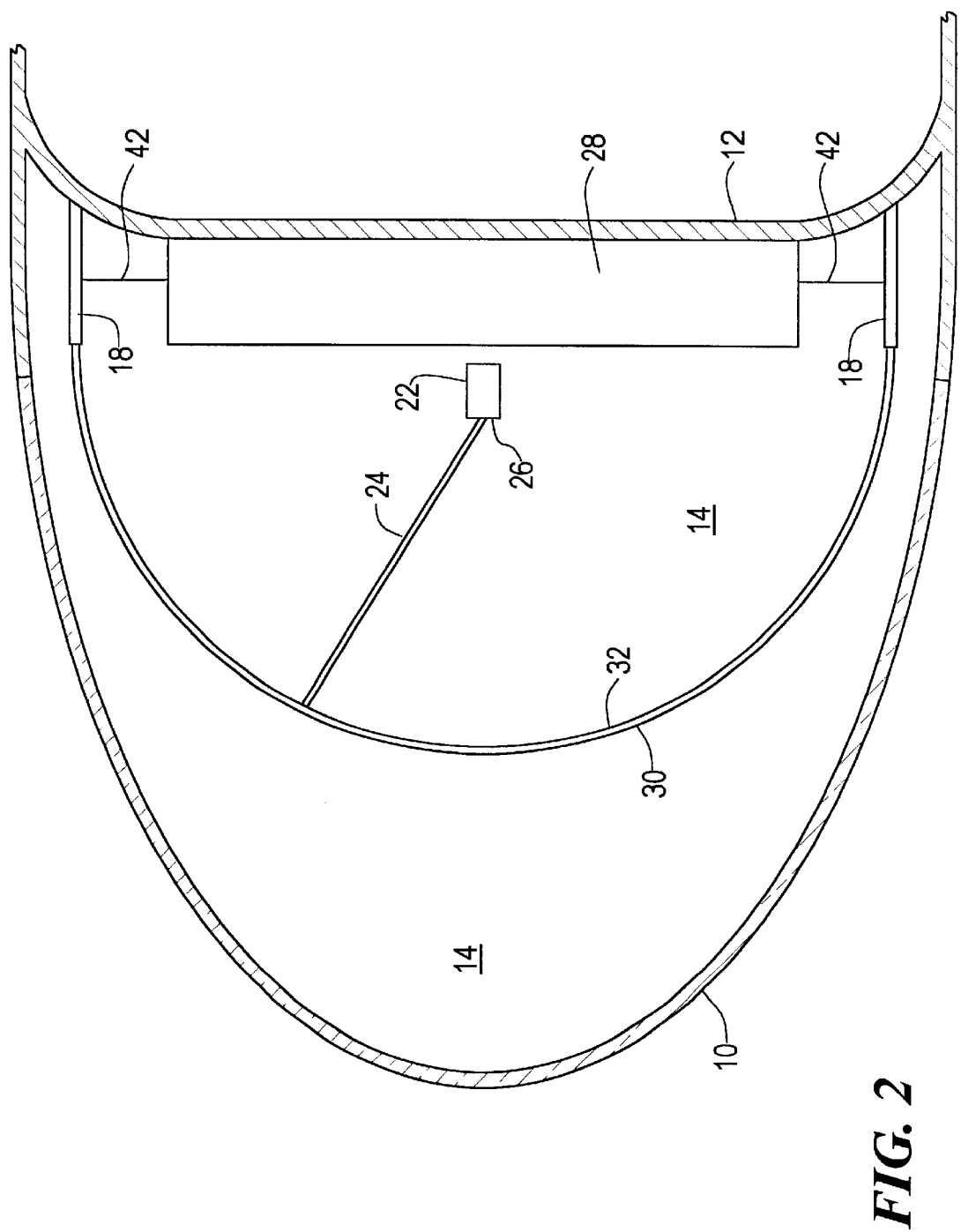
FIGS. 2 and 3 are similar to FIG. 1 but illustrate alternative embodiments of submarine bow dome acoustic sensor assemblies.

In FIG. 2, there is shown an alternative embodiment of assembly in which the acoustic panel portion of the assembly comprises a hemispherically configured acoustic panel 30 instead of the flat panel 16 of FIG. 1. Inner surface 32 of panel 30 has the appropriate properties to reflect laser beam 24. The acoustic panel 30 is provided with a circular edge 42 facing aft in the free flood zone 14. In this embodiment, laser 22 scans an inner surface 32 of panel 30 with beam 24. The dome configuration of acoustics panel 30, shown in FIG. 2, is heavier than the flat configuration of acoustic panel 16 shown in FIG. 1, but provides better directionality. Aside from the configurations of the acoustic panels 16, 30, the systems of FIGS. 1 and 2 are essentially the same.

Figure 3:
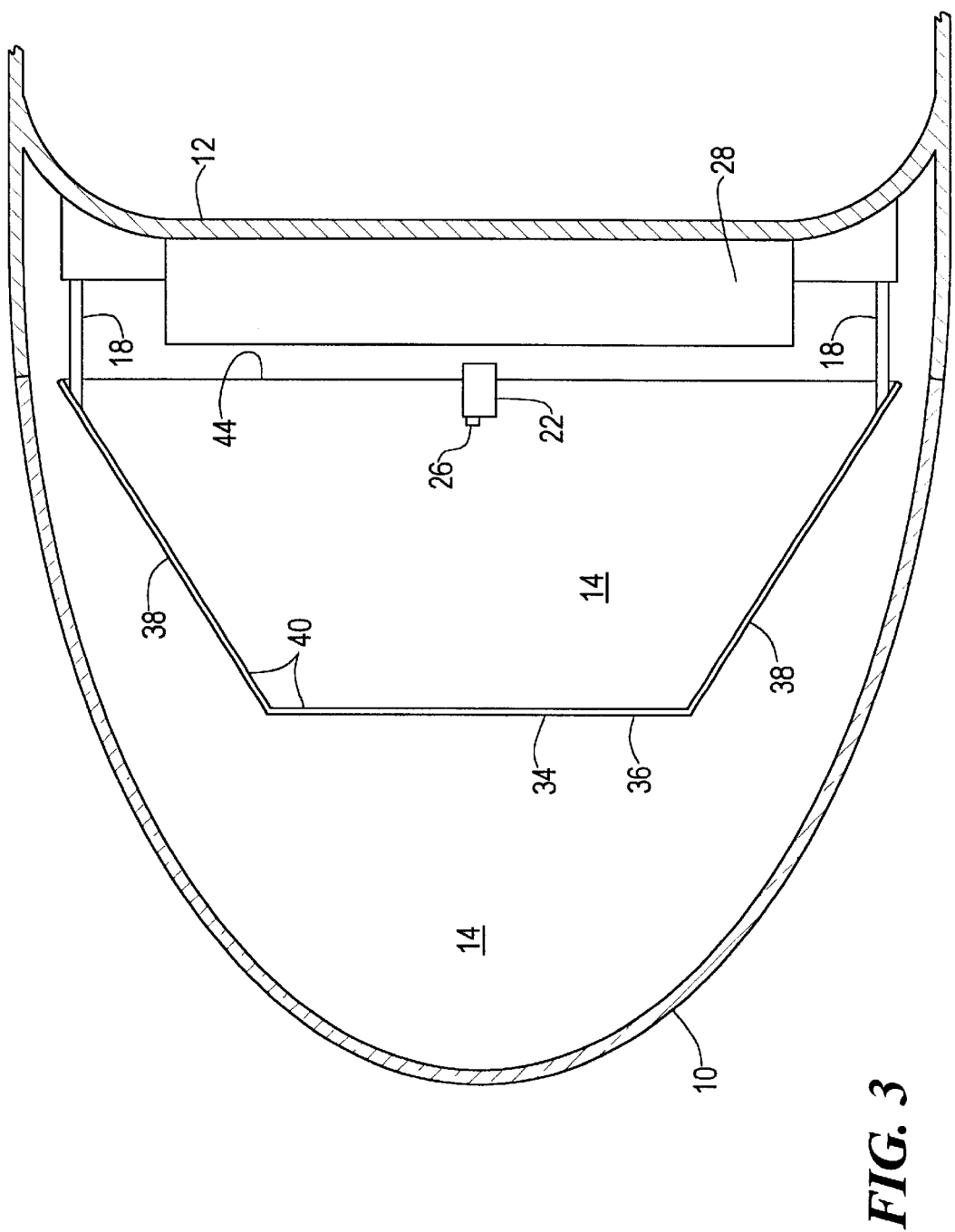

In FIG. 3, there is shown another alternative embodiment of assembly in which the acoustic panel portion of the assembly comprises a frusto-conically configured acoustic panel 34. The panel 34 includes a planar panel 36 joined to a frusto-conncally shaped panel 38 to form the panel 34, which is provided with a surface 40 having properties similar to those of surfaces 20, 32. An aft edge 44 of the acoustic panel 34 is circular in configuration. The operation of the embodiment of FIG. 3 is substantially the same as the operation of the embodiments of FIGS. 1 and 2.

There is thus provided a submarine bow dome acoustic sensor assembly which is substantially lighter in weight than the usual spherical array of acoustic transducers, is reliable in detection and tracking of contacts, and which costs substantially less to manufacture than the spherical arrays.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A submarine bow dome acoustic sensor assembly comprising:
    an outer hull bow portion;
    an inner pressure hull wall extending athwartships and in conjunction with said outer hull bow portion defining a free-flood compartment;
    an acoustic bow panel disposed in said compartment and connected to said pressure hull wall by acoustically isolating supports extending from said base panel to said pressure hull wall;
    a laser scanner disposed in said compartment and oriented so as to project a laser beam onto a surface of said acoustic bow panel; and
    a sensor disposed in said compartment and oriented so as to receive reflections of the laser beam off the acoustic panel and to transmit data from which a position of a sound generating source can be determined.

2. The assembly in accordance with claim 1 and further comprising an acoustic source mounted in the free-flood compartment and on a forward side of said inner pressure hull wall for generating and sending acoustic signals outwardly from said assembly.

3. The assembly in accordance with claim 1 wherein said acoustic bow panel comprises a substantially planar panel extending athwartships of said compartment.

4. The assembly in accordance with claim 3 wherein an edge of said planar panel is generally circular in configuration.

5. The assembly in accordance with claim 1 wherein said acoustic bow panel comprises a substantially hemispherically-shaped panel forming an after-facing concavity.

6. The assembly in accordance with claim 5 wherein an edge of said hemispherically-shaped panel is generally circular in configuration.

7. The assembly in accordance with claim 1 wherein said acoustic bow panel comprises a combination of a planar panel joined to a frusto-conically shaped panel to form the single bow panel.

8. The assembly in accordance with claim 7 wherein said planar panel is a central athwartships-extending panel, and said frusto-conically shaped panel extends from said planar panel rearwardly and outwardly from an edge of said planar panel.

9. An acoustic sensor assembly for positioning in the bow dome of a submarine comprising:
    an acoustic bow panel disposed in the bow dome and connected to a hull of the submarine by acoustically isolating supports extending from said bow panel to the hull;
    a laser scanner disposed in the bow dome and oriented so as to project a laser beam onto a surface of said acoustic bow panel; and
    a sensor disposed in the bow dome and oriented so as to receive reflections of the laser beam off said acoustic panel and to transmit data responsive to a frequency shift of the beam.

10. The assembly in accordance with claim 9 wherein said acoustic bow panel comprises a substantially planar panel extending athwartships of the bow dome.

11. The assembly in accordance with claim 9 wherein said acoustic bow panel comprises a substantially hemispherically-shaped panel forming an after-facing concavity.

12. The assembly in accordance with claim 9 wherein said acoustic bow panel comprises a combination of a planar panel joined to a frusto-conically shaped panel to form the single bow panel.

13. The assembly in accordance with claim 1 wherein said laser scanner is a vibrometer having a laser beam which moves rapidly over the surface of said acoustic bow panel.

14. The assembly in accordance with claim 9 wherein said laser scanner is a vibrometer having a laser beam which moves rapidly over the surface of said acoustic bow panel.

* * * * *